United States Patent
Nakauchi et al.

(10) Patent No.: US 10,486,751 B2
(45) Date of Patent: Nov. 26, 2019

(54) SIDE VEHICLE BODY STRUCTURE OF VEHICLE

(71) Applicant: MAZDA MOTOR CORPORATION, Aki-gun, Hiroshima (JP)

(72) Inventors: Shigeru Nakauchi, Hiroshima (JP); Nobuyuki Nakayama, Hiroshima (JP); Takayuki Nakamae, Hiroshima (JP); Kazuya Ochi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 91 days.

(21) Appl. No.: 15/735,557

(22) PCT Filed: Oct. 6, 2016

(86) PCT No.: PCT/JP2016/079806
§ 371 (c)(1),
(2) Date: Dec. 11, 2017

(87) PCT Pub. No.: WO2017/065086
PCT Pub. Date: Apr. 20, 2017

(65) Prior Publication Data
US 2018/0354559 A1    Dec. 13, 2018

(30) Foreign Application Priority Data
Oct. 16, 2015 (JP) ................................ 2015-204148

(51) Int. Cl.
*B62D 25/04* (2006.01)
*B62D 25/08* (2006.01)

(52) U.S. Cl.
CPC ......... *B62D 25/088* (2013.01); *B62D 25/081* (2013.01); *B62D 25/082* (2013.01)

(58) Field of Classification Search
CPC ... B62D 25/088; B62D 25/081; B62D 25/082
See application file for complete search history.

(56) References Cited

U.S. PATENT DOCUMENTS

| | | | |
|---|---|---|---|
| 9,517,798 B2 * | 12/2016 | Matsuo | .................. B62D 21/15 |
| 2007/0215402 A1 * | 9/2007 | Sasaki | .................. B62D 21/152 |
| | | | 180/232 |

(Continued)

FOREIGN PATENT DOCUMENTS

| | | |
|---|---|---|
| CN | 101795929 A | 8/2010 |
| JP | 2006182197 A | 7/2006 |

(Continued)

OTHER PUBLICATIONS

ISA Japan Patent Office, International Search Report Issued in PCT Application No. PCT/JP2016/079806, dated Nov. 1, 2016, WIPO, 2 pages.

*Primary Examiner* — Lori L Lyjak
(74) *Attorney, Agent, or Firm* — Alleman Hall Creasman & Tuttle LLP

(57) ABSTRACT

A side vehicle body structure prevents a fastening bolt of a cowl member from being loosened while suppressing production cost. The structure includes a pair of left and right suspension towers each formed so as to expand into an engine room and supporting a buffer device of a front suspension, and a cowl member extending forward from an upper end portion of a dash panel separating the engine room from a vehicle interior. Left and right end portions of the cowl member are coupled to respective top portions of the suspension towers by a pair of fastening portions using bolts, and each fastening portion includes a first bolt fastening portion arranged inward of a corresponding center of the top portion and at least partially overlapping a line connecting the centers, and a second bolt fastening portion arranged at a front side of the first bolt fastening portion.

4 Claims, 7 Drawing Sheets

(56) References Cited

U.S. PATENT DOCUMENTS

2007/0246971 A1    10/2007    Hanakawa et al.
2011/0285173 A1    11/2011    Ishii et al.

FOREIGN PATENT DOCUMENTS

| | | | |
|---|---|---|---|
| JP | 2007284008 | A | 11/2007 |
| JP | 2009190620 | A | 8/2009 |
| JP | 2011121480 | A | 6/2011 |
| JP | 2014019165 | A | 2/2014 |

* cited by examiner

SIDE VEHICLE BODY STRUCTURE OF VEHICLE

TECHNICAL FIELD

The present invention relates to a side vehicle body structure of a vehicle, the side vehicle body structure being configured such that left and right end portions of a cowl member are fastened to respective top portions of a pair of left and right suspension towers by bolts.

BACKGROUND ART

A side vehicle body structure of a vehicle is conventionally known, which includes: a dash panel separating an engine room and a vehicle interior from each other, the vehicle interior being located behind the engine room; and a cowl member extending forward from an upper end portion of the dash panel, and is configured such that left and right end portions of a front flange portion of the cowl member are joined to respective top portions of front suspension towers by spot welding. According to this vehicle body structure, support rigidity of the suspension towers with respect to a push-up load applied from a road surface during traveling can be improved while improving rigidity of a vehicle body.

From the viewpoint of performance of the vehicle, the top portions of the suspension towers, a dash lower panel, and the like tend to be increased in width. Therefore, since upper portions of parts attached to the dash panel are covered with the cowl member, there are problems regarding serviceability of the parts attached to the dash panel, especially regarding the ease of work of replacing a power braking device.

In the case of adopting a structure in which the cowl member is attached to the top portions of the suspension towers by bolt fastening, the cowl member is detachable from the suspension towers. However, fastening bolts of the cowl member may be loosened by deformation (plastic strain) generated at bolt fastening portions.

A side vehicle body structure of a vehicle in PTL 1 includes a cowl member including both vehicle width direction front end portions that can be fastened to respective top portions of a pair of left and right suspension towers by bolts. The cowl member includes: a bottom portion extending in a vehicle width direction; a front vertical wall portion extending upward from a front end portion of the bottom portion; and a front flange portion horizontally extending forward from an upper end portion of the front vertical wall portion and including bolt holes. Further, a convex portion is provided at a vehicle width direction inner side of the bolt holes of the front flange portion so as to project forward. An inclined vertical wall portion that is continuous with a rear end of the front flange portion so as to form an obtuse angle is formed at the convex portion.

With this, loads acting on the bolt holes (bolt fastening portions) of the cowl member in a forward/rearward direction and a leftward/rightward direction can be guided to the convex portion. Thus, the concentration of the loads on the bolt holes can be avoided.

CITATION LIST

Patent Literature

PTL 1: Japanese Laid-Open Patent Application Publication No. 2014-19165

SUMMARY OF INVENTION

Technical Problem

According to the side vehicle body structure of the vehicle in PTL 1, the convex portion can be formed at the cowl member without forming a bent portion on which loads concentrate. Further, the loads guided from around the bolt holes can be distributed to a downstream portion (vehicle width direction middle portion). Therefore, the fastening bolts can be prevented from being loosened.

However, according to the side vehicle body structure of the vehicle in PTL 1, the convex portion including the inclined vertical wall portion is formed at the cowl member, that is, a structural change of the cowl member is performed, and this may increase a production cost.

An object of the present invention is to provide a side vehicle body structure of a vehicle, the side vehicle body structure being capable of, without a structural change of a cowl member, preventing a fastening bolt of the cowl member from being loosened.

Solution to Problem

A side vehicle body structure of a vehicle according to a first aspect of the present invention includes: a pair of left and right suspension towers each formed so as to expand into an engine room of the vehicle and supporting a buffer device of a front suspension; and a cowl member extending toward a vehicle body front side from an upper end portion of a dash panel separating the engine room and a vehicle interior from each other, wherein: left and right end portions of the cowl member are coupled to respective top portions of the suspension towers by a pair of left and right fastening portions fastened to the respective top portions of the suspension towers by bolts; and each of the fastening portions includes a first bolt fastening portion arranged at a vehicle width direction inner side of a corresponding one of centers of the top portions of the left and right suspension towers and at least partially overlapping a connecting line connecting the centers of the top portions of the left and right suspension towers and a second bolt fastening portion arranged at a front side of the first bolt fastening portion.

According to the side vehicle body structure of the vehicle, the left and right end portions of the cowl member are coupled to the respective top portions of the suspension towers by the left and right fastening portions fastened to the respective top portions of the suspension towers by the bolts. Therefore, serviceability of the parts attached to the dash panel can be secured.

Each of the fastening portions includes: the first bolt fastening portion arranged at a vehicle width direction inner side of a corresponding one of the centers of the top portions of the left and right suspension towers and at least partially overlapping the connecting line connecting the centers of the top portions of the left and right suspension towers; and the second bolt fastening portion arranged at a front side of the first bolt fastening portion. Therefore, a torsional moment generated at the left and right end portions of the cowl member and acting on the first bolt fastening portions can be reduced by the second bolt fastening portions.

With this, the loads concentrating on the first bolt fastening portions and acting in the forward/rearward direction and the leftward/rightward direction can be positively distributed to the second bolt fastening portions without the structural change of the cowl member. Thus, the loads acting on the respective bolt fastening portions can be equalized.

The side vehicle body structure according to a second aspect of the present invention is configured such that in the first aspect of the present invention, each of the fastening portions includes: a third bolt fastening portion arranged at a rear side and a vehicle width direction outer side of the first bolt fastening portion; and a fourth bolt fastening portion arranged at a vehicle width direction outer side of and adjacent to the third bolt fastening portion.

According to this configuration, the cowl member can be restrained to the top portions of the suspension towers in a wide range. Thus, the torsional moment generated at the left and right end portions of the cowl member can be further reduced.

The side vehicle body structure according to a third aspect of the present invention is configured such that in the second aspect of the present invention, an intersection angle which is formed by an extended line including a line connecting the first and second bolt fastening portions and an extended line including a line connecting the third and fourth bolt fastening portions and is located at a front side and a vehicle width direction outer side is set to a substantially right angle or an acute angle.

According to this configuration, the left and right end portions of the cowl member, each of which portions is located at a vehicle width direction outer side of the corresponding first bolt fastening portion, can be restrained to the respective top portions of the suspension towers. Thus, the torsional moment acting on the first bolt fastening portions can be further reduced.

The side vehicle body structure according to a fourth aspect of the present invention is configured such that in any of the first to third aspects of the present invention, the cowl member includes flat surface portions each located at a rear side of and close to the first bolt fastening portion.

According to this configuration, generation of load concentrating portions at the left and right end portions of the cowl member can be suppressed.

The side vehicle body structure according to a fifth aspect of the present invention is configured such that in any of the first to fourth aspects of the present invention, the first and second bolt fastening portions are coupled to the top portions of the suspension towers through brackets.

According to this configuration, the left and right end portions of the cowl member can be coupled to the respective top portions of the suspension towers without changing the structures of the top portions of the suspension towers.

Advantageous Effects of Invention

According to the side vehicle body structure of the vehicle of the present invention, the fastening bolts of the cowl member can be prevented from being loosened while suppressing a production cost.

BRIEF DESCRIPTION OF DRAWINGS

FIG. 9A is a plan view showing a vicinity of a portion where a cowl member of a model corresponding to Embodiment 1 is attached. FIG. 9B is a plan view showing a vicinity of a portion where a cowl member of a model corresponding to Comparative Example is attached.

DESCRIPTION OF EMBODIMENTS

Figure 1:
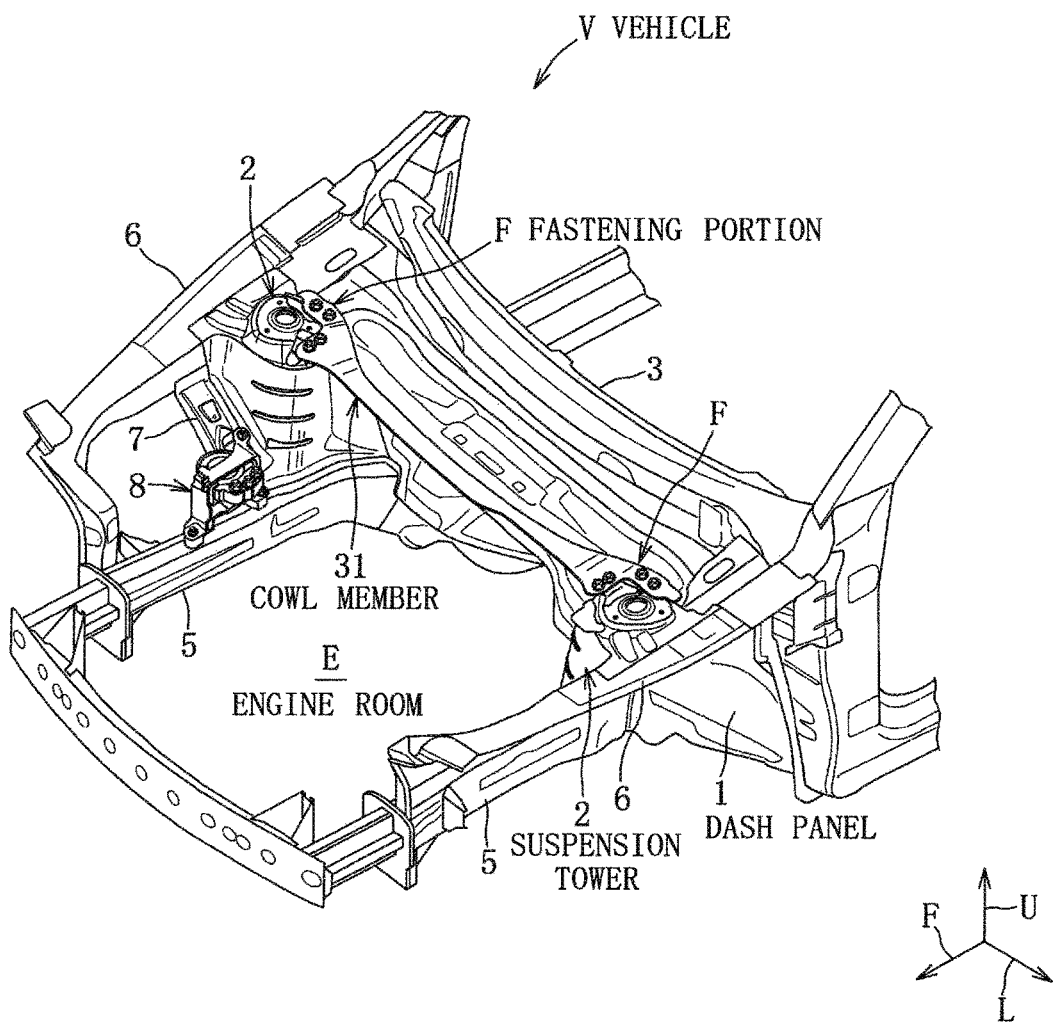
FIG. 1 is a perspective view showing a side vehicle body structure of a vehicle according to Embodiment 1 of the present invention.

Hereinafter, an embodiment will be explained.

The following explanation is an example in which the present invention is applied to a side vehicle body structure of a vehicle. Therefore, the following explanation does not limit any of the present invention, products to which the present invention is applied, and usage of the present invention.

Embodiment 1

Hereinafter, Embodiment 1 of the present invention will be explained based on FIGS. 1 to 10.

First, a basic structure of a vehicle V will be explained.

As shown in FIGS. 1 to 5, the vehicle V includes: a dash panel 1 separating an engine room E and a vehicle interior from each other; a pair of left and right front suspension towers (hereinafter abbreviated as "suspension towers") provided so as to expand into the engine room E; a cowl panel 3 provided at an upper side of the dash panel 1 and extending in a leftward/rightward direction; and the like.

In the present embodiment, a direction shown by an arrow F is a forward direction, a direction shown by an arrow L is a leftward direction, and a direction shown by an arrow U is an upper direction.

The dash panel 1 includes: a vertical wall portion located at a front end portion of the vehicle interior and extending in an upper/lower direction; an inclined portion extending rearward from a lower end edge of the vertical wall portion so as to be inclined toward a rear lower side; and a dash cross member 4 located at a rear surface of the vertical wall portion and constituting a closed section together with the vertical wall portion, the closed section extending in the leftward/rightward direction.

Rear end portions of a pair of left and right front side frames 5 are coupled to a front surface of a lower end portion of the vertical wall portion through a pair of left and right coupling portions.

As shown in FIGS. 1 to 4, a pair of left and right wheel apron reinforcements (hereinafter abbreviated as "apron reinforcements") 6 extending in the forward/rearward direction are provided at respective left and right end portions of the engine room E. The left and right apron reinforcements form left and right side walls of the engine room E, respectively. These apron reinforcements 6 are coupled by coupling frames 7 to respective portions of the left and right front side frames 5 provided under the apron reinforcements 6. The front side frames 5, the apron reinforcements 6, and the coupling frames 7 cooperate to support the suspension towers 2 at the vehicle body.

A pair of left and right engine mounts 8 supporting an engine (not shown) at the vehicle body are provided at the left and right front side frames 5, respectively.

Each of the engine mounts 8 includes three leg portions 8a and 8b that are: a pair of leg portions 8a located at a vehicle width direction inner side and adjacent to each other in the forward/rearward direction; and a leg portion 8b located at a vehicle width direction outer side.

The leg portions 8a are supported by an upper portion of the front side frame 5 through bolts, and the leg portion 8b is supported by a lower end portion of the coupling frame 7 through a bolt.

Figure 3:
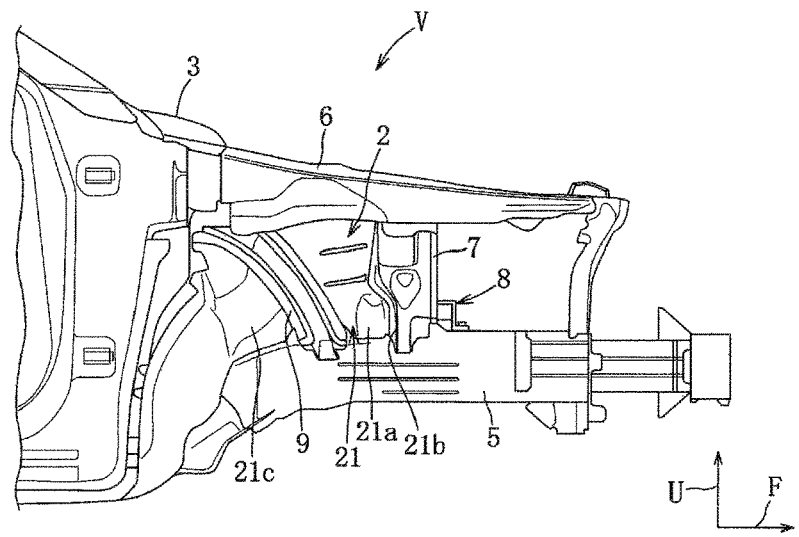
FIG. 3 is a side view showing the side vehicle body structure when viewed from a right side.
Figure 5:
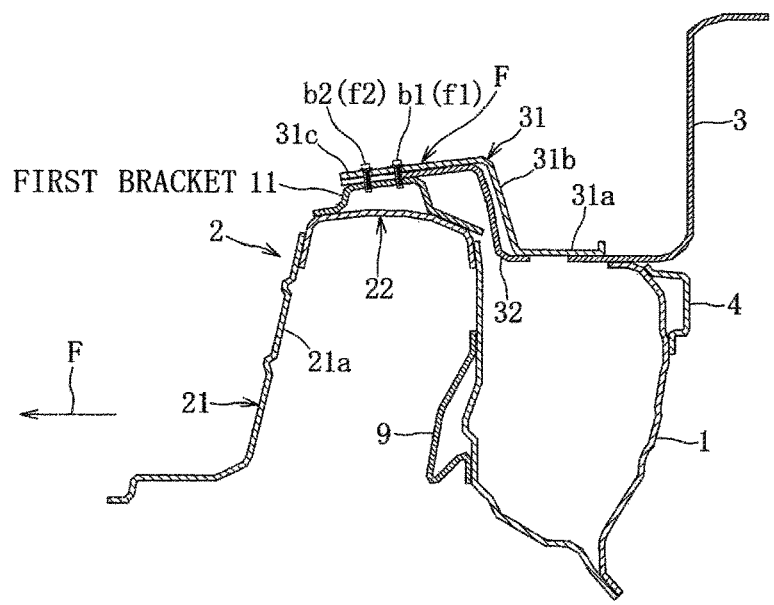
FIG. 5 is a sectional view taken along line V-V of FIG. 4.
Figure 6:
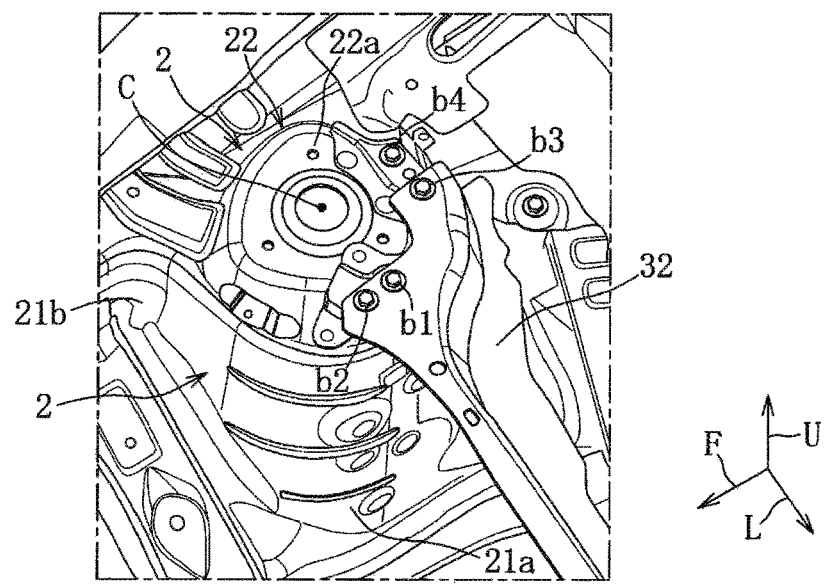
FIG. 6 is an enlarged view showing major components of the side vehicle body structure of FIG. 4 from which a cowl member is detached.

As shown in FIGS. 3 and 5, each of a pair of left and right reinforcing members 9 is provided so as to extend from an upper portion of the corresponding front side frame 5, which portion is located in the vicinity of a vehicle width direction outer side lower portion of the corresponding suspension tower 2, to the dash panel 1 in the upper direction and outward in the vehicle width direction. Each of the reinforcing members 9 is formed to have a substantially hat-shaped section and forms a closed section together with the suspension tower 2 at a vehicle width direction outer side of the suspension tower 2.

Next, the left and right suspension towers 2 will be explained.

Since the left and right suspension towers 2 are structured symmetrically in the leftward/rightward direction, the following will mainly explain the structure of the right-side suspension tower 2.

As shown in FIGS. 1 to 8, the suspension tower 2 is formed so as to expand from a wheel apron into the engine room E. The suspension tower 2 includes a side wall portion 21, a top portion 22, and the like.

The side wall portion 21 is formed by subjecting a high-tensile steel plate having tensile strength of 490 MPa or more to press-forming. The side wall portion 21 integrally includes: a tubular portion 21a having a partially tubular shape that is bent to have a center axis extending upward as it extends rearward; a front flange portion 21b projecting forward from a front end portion of the tubular portion 21a and extending upward as it extends rightward; and a rear flange portion 21c projecting rearward from a rear end portion of the tubular portion 21a.

The front flange portion 21b is joined to a rear end portion of the coupling frame 7.

A position where the leg portion 8b of the engine mount 8 is supported by the coupling frame 7 is located in the vicinity of the front flange portion 21b. An upper half of the rear flange portion 21c is joined to a side wall portion of the wheel apron, and a lower half of the rear flange portion 21c is joined to an upper portion of a wheel housing (not shown).

The top portion 22 of the suspension tower 2 is formed in a bowl shape that closes an upper end portion of the tubular portion 21a.

An opening is formed at a center portion of the top portion 22. A center C of the top portion 22 is located at substantially the same position as an intersection point between the center axis of the tubular portion 21a and the top portion 22.

A convex portion 22a having a substantially triangle shape in plan view and projecting upward is formed around the opening of the top portion 22.

Figure 7:
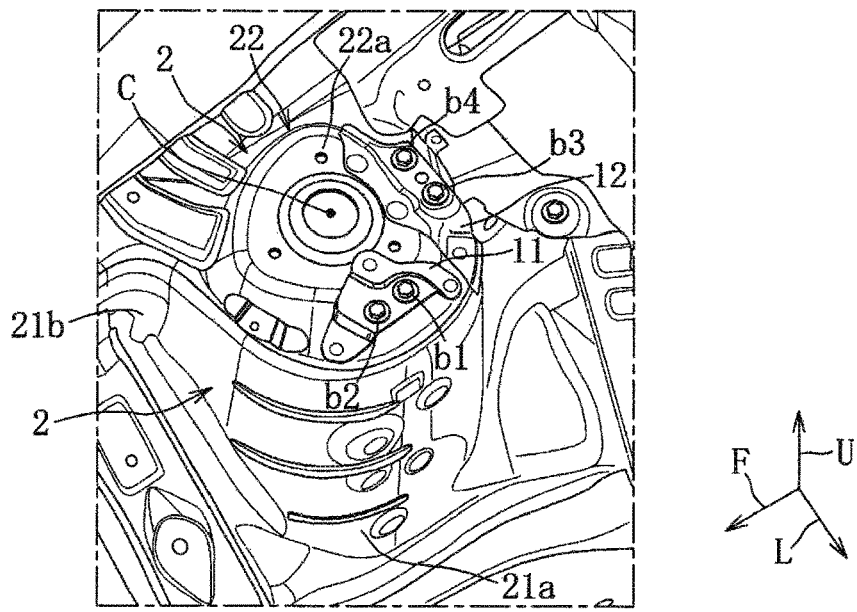
FIG. 7 is a diagram showing the side vehicle body structure of FIG. 6 from which a cowl front is detached.
Figure 8:
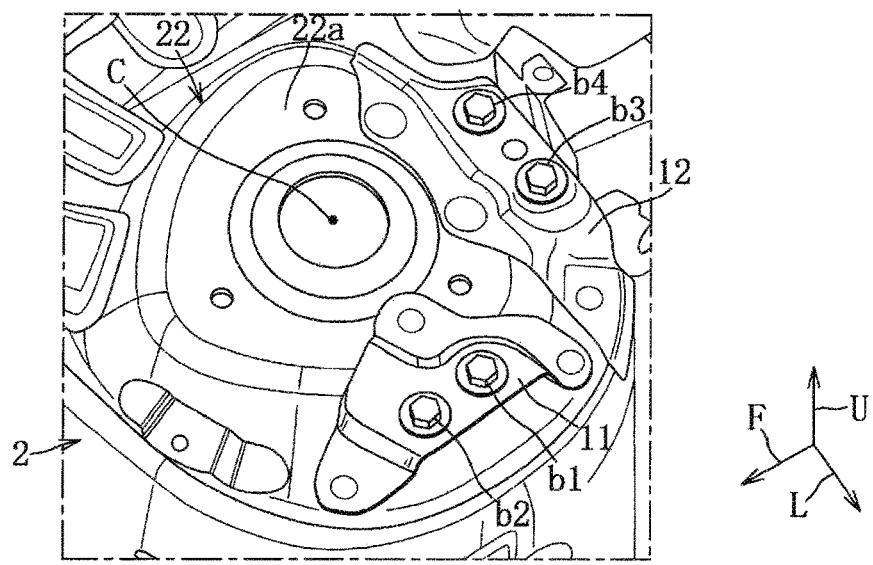
FIG. 8 is an enlarged view showing major components of the side vehicle body structure of FIG. 7.

As shown in FIGS. 7 and 8, first and second brackets 11 and 12 are fixed to the top portion 22.

The first bracket 11 is arranged at a left side of the opening of the top portion 22 and includes: a pair of front and rear leg portions joined to a left outer peripheral portion of the top portion 22; and a right leg portion joined to the convex portion 22a of the top portion 22. A pair of front and rear bolt holes are formed on the first bracket 11.

The second bracket 12 is arranged at a rear side of the opening of the top portion 22 and includes: a pair of left and right leg portions joined to a rear outer peripheral portion of the top portion 22; and a front leg portion joined to the convex portion 22a of the top portion 22. A pair of left and right bolt holes are formed on the second bracket 12.

For example, an upper portion of a buffer device (a damper, a spring, or the like) of a front suspension mechanism (not shown) is accommodated in the suspension tower 2. Then, a spring seat coupled to an upper end portion of the buffer device is fastened and fixed to the top portion 22 by a fastening member through a mount rubber. The front suspension mechanism of the present embodiment is such a type that loads in the forward/rearward direction and the leftward/rightward direction are input to the suspension tower 2 in addition to a load in the upward/downward direction (center axis direction). One example of the front suspension mechanism of the present embodiment is a strut type suspension. Since the strut type suspension has a known structure including a lower arm, a buffer device, a coil spring, and the like, a detailed explanation thereof is omitted.

Next, the cowl panel 3 will be explained.

The cowl panel 3 is formed so as to be able to support front window glass (not shown).

As shown in FIGS. 1 to 7, a vertical cross section of a vertical surface, perpendicular to the vehicle width direction, of a vehicle width direction middle portion of the cowl panel 3 is formed in a substantially S shape. The cowl panel 3 includes: a cowl member 31 extending forward from a front end portion of the cowl panel 3; and a cowl front 32. The cowl panel 3, the cowl member 31, and the cowl front 32 forms an open cowl structure having an upwardly open section structure in side view.

Together with the cowl panel 3, the cowl member 31 constitutes a downwardly concave tub shape extending in the leftward/rightward direction. The cowl member 31 includes a tub-shaped bottom wall portion 31a and a front wall portion 31b. A width of a vehicle width direction middle portion of the cowl member 31 in the forward/rearward direction is larger than a width of each of left and right end portions of the cowl member 31 in the forward/rearward direction. A flange portion 31c is formed so as to horizontally extend forward from a front end portion of the front wall portion 31b. Fastening portions F by which the cowl member 31 is fastened and fixed to the first and second brackets 11 and 12 by bolts b1 to b4 are formed at respective left and right end portions of the flange portion 31c. Since the left and right fastening portions F are structured symmetrically in the leftward/rightward direction, the following will mainly explain the right-side fastening portion F.

As shown in FIGS. 1, 2, 4, and 5, the fastening portion F is formed in a substantially L shape in plan view. The fastening portion F includes: a first bolt fastening portion f1 and second bolt fastening portion f2 which are arranged at a left side of the center C of the top portion 22; and a third bolt fastening portion f3 and fourth bolt fastening portion f4 which are arranged at a rear side of the center C of the top portion 22.

The first to fourth bolt fastening portions f1 to f4 include respective bolt holes through which the bolts b1 to b4 can be inserted.

The first bolt fastening portion f1 is formed such that a center axis of the bolt b1 overlaps a connecting line L1 connecting the centers C of the left and right top portions 22. The second bolt fastening portion f2 is formed at a front side of the first bolt fastening portion f1. The first and second bolt fastening portions f1 and f2 are fastened and fixed to the first bracket 11 by the respective bolts b1 and b2.

The third bolt fastening portion f3 is formed at a rear right side of the first bolt fastening portion f1. The fourth bolt fastening portion f4 is formed at a right side of the third bolt fastening portion f3 and a rear side of the center C of the top portion 22. The third and fourth bolt fastening portions f3 and f4 are fastened and fixed to the second bracket 12 by the respective bolts b3 and b4.

With this, the cowl member 31 is restrained to the top portions 22 in a wide range.

Figure 2:
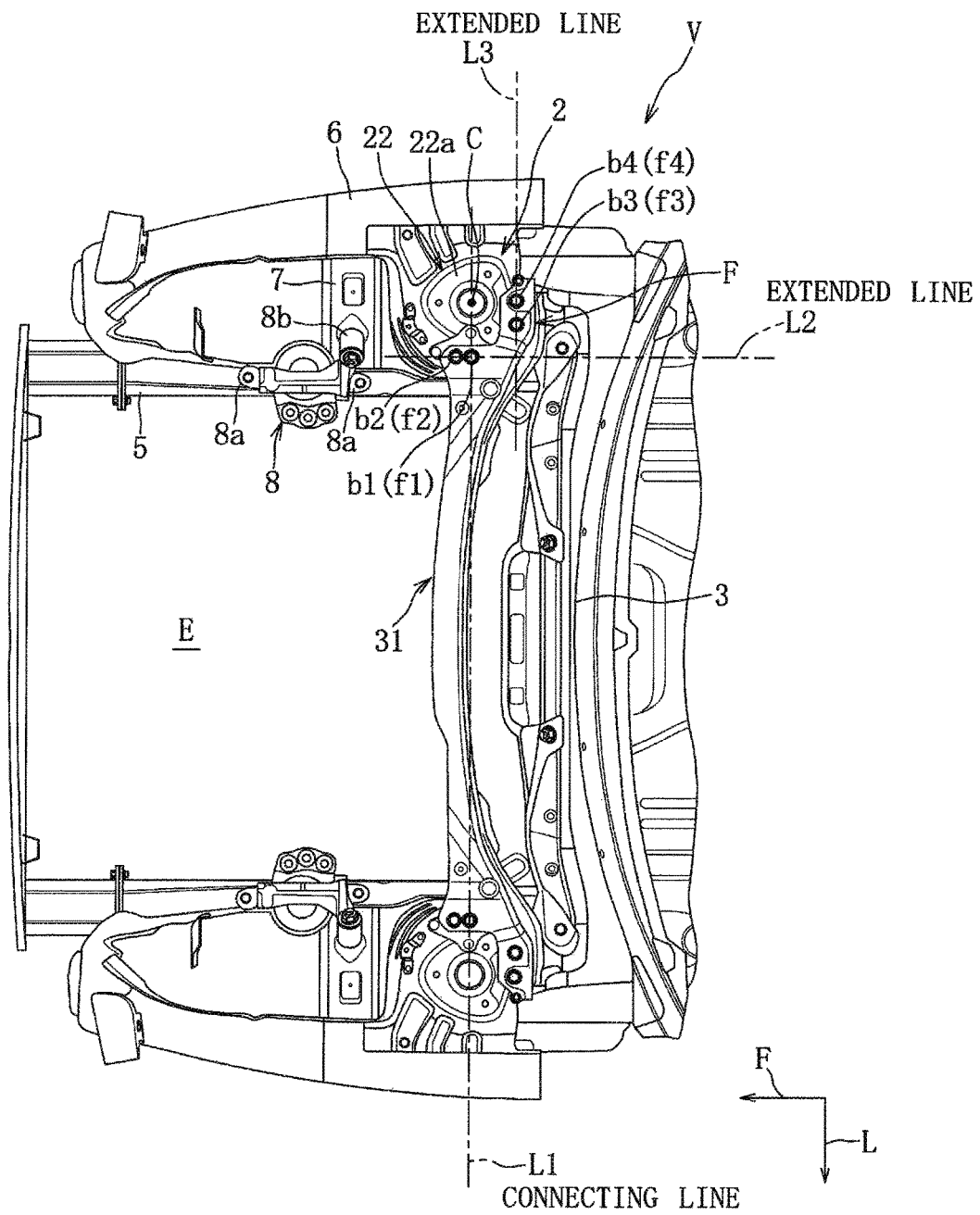
FIG. 2 is a plan view showing the side vehicle body structure.

As shown in FIG. 2, an extended line L2 including a line connecting the first bolt fastening portion f1 and the second bolt fastening portion f2 and an extended line L3 including a line connecting the third bolt fastening portion f3 and the fourth bolt fastening portion f4 are set to be substantially perpendicular to each other. With this, a part of the cowl member 31 which part is located at a right side of the first bolt fastening portion f1 can be restrained to (pressed against) the top portion 22. Thus, a torsional moment acting on the first bolt fastening portion f1 due to a push-up load applied from a road surface is reduced.

Figure 4:
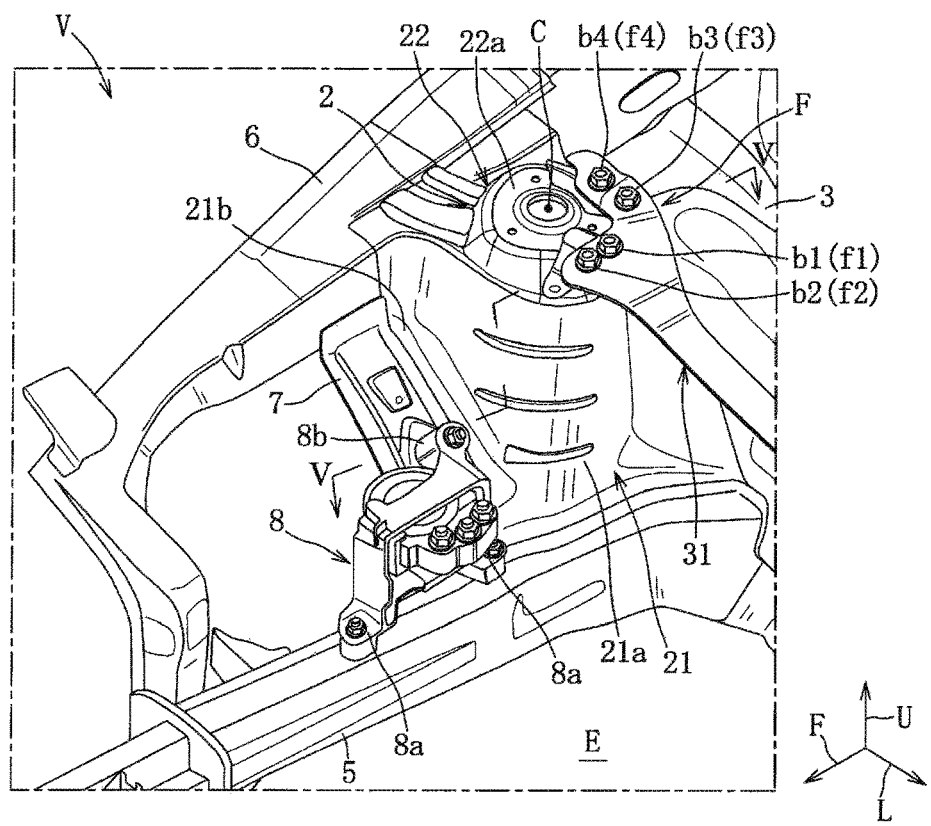
FIG. 4 is an enlarged view showing major components of the side vehicle body structure shown in FIG. 1.

As shown in FIGS. 2 and 4, the fastening portion F includes a flat surface portion located at a rear side of and close to the first bolt fastening portion f1. With this, loads concentrating on the left and right fastening portions F of the cowl member 31 are reduced, and the torsional moment and deformation caused by the torsional moment are suppressed.

Next, actions and effects by a front vehicle body structure of the vehicle V of the present embodiment will be explained.

To explain the actions and effects of the present embodiment, a model MA of the vehicle V of the present embodiment and a model MB that is a vehicle for comparison are prepared. Loads acting on the bolt fastening portions when top portions of left and right front suspensions are excited by predetermined vibrations are analyzed by CAE (Computer Aided Engineering).

First, analysis conditions of the CAE will be explained.

Figure 9A:
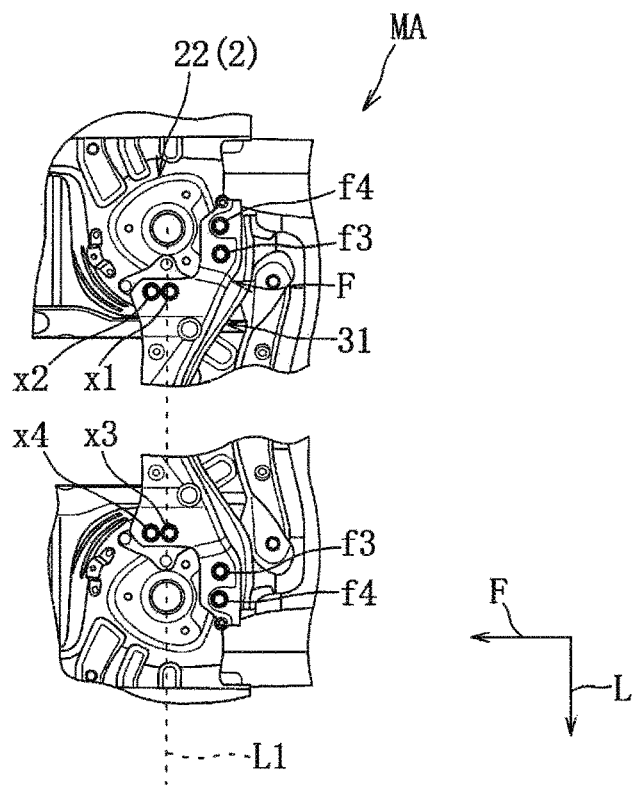
FIGS. 9A and 9B show analytical models.

As shown in FIG. 9A, the model MA is configured in the same manner as Embodiment 1, and to fasten and fix each of the left and right end portions of the cowl member 31 to the top portions 22, a bolt fastening portion x1 (x3) corresponding to the first bolt fastening portion f1, a bolt fastening portion x2 (x4) corresponding to the second bolt fastening portion f2, and the third and fourth bolt fastening portions f3 and f4 are set in the model MA.

Figure 9B:
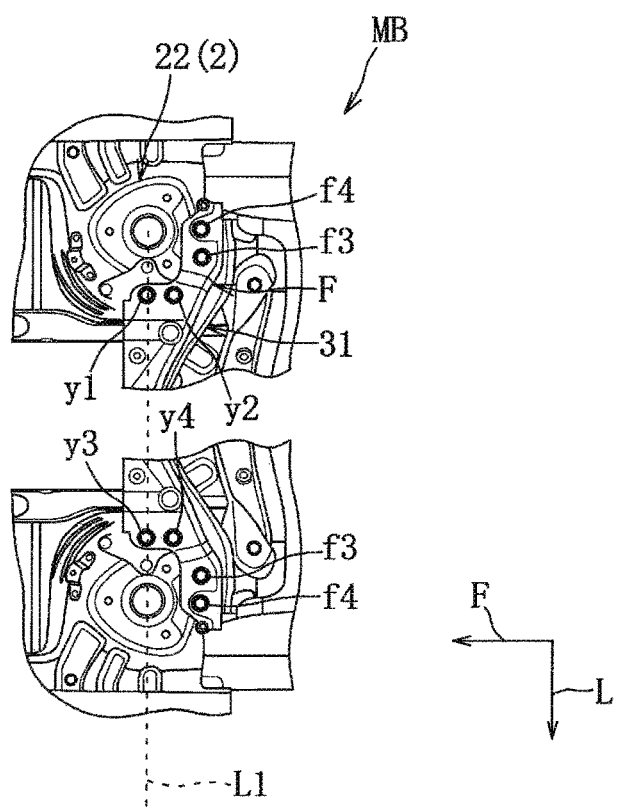

As shown in FIG. 9B, to fasten and fix each of the left and right end portions of the cowl member 31 to the top portions 22, a bolt fastening portion y1 (y3) corresponding to the first bolt fastening portion f1, a bolt fastening portion y2 (y4) located at a rear side of the bolt fastening portion y1 (y3), and the third and fourth bolt fastening portions f3 and f4 are set in the model MB. In FIGS. 9A and 9B, the same reference signs are used for the same portions and members as Embodiment 1.

Figure 10:
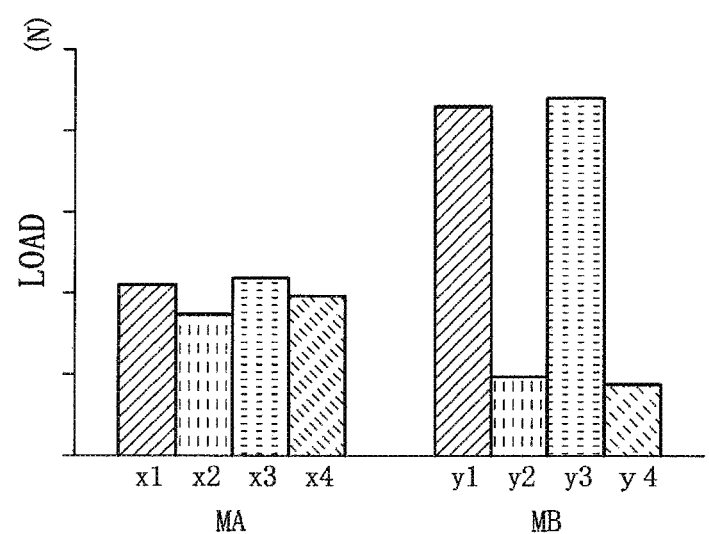
FIG. 10 is a graph showing an analytical result.

FIG. 10 shows an analytical result by the CAE.

As shown in FIG. 10, in the model MB, the load acting on the bolt fastening portion y1 (y3) located on the connecting line L1 is significantly larger than the load acting on the bolt fastening portion y2 (y4) located at a rear side of the bolt fastening portion y1 (y3). To be specific, it is found that the load is hardly distributed from the bolt fastening portion y1 (y3) to the bolt fastening portion y2 (y4) located at the rear side.

In contrast, in the model MA, the load acting on the bolt fastening portion x1 (x3) located on the connecting line L1 is substantially equal to the load acting on the bolt fastening portion x2 (x4) located at a front side of the bolt fastening portion x1 (x3). To be specific, it is found that the load is easily distributed from the bolt fastening portion x1 (x3) to the bolt fastening portion x2 (x4) located at the front side.

According to the present embodiment, the left and right end portions of the cowl member 31 are coupled to the respective top portions 22 of the pair of suspension towers 2 by the pair of left and right fastening portions F fastened by the bolts b1 to b4 to the respective top portions 22. Therefore, serviceability of parts attached to the dash panel 1 can be secured.

Each of the fastening portions F includes: the first bolt fastening portion f1 arranged at a vehicle width direction inner side of the center C of the top portion 22 of the corresponding left or right suspension tower 2 and at least partially overlapping the connecting line L1 connecting the centers C of the top portions 22 of the left and right suspension towers 2; and the second bolt fastening portion 12 arranged at a front side of the first bolt fastening portion f1 Therefore, the torsional moment generated at the left and right end portions of the cowl member 31 and acting on the first bolt fastening portions f1 can be reduced by the second bolt fastening portions f2. With this, the loads concentrating on the first bolt fastening portions f1 and acting in the forward/rearward direction and the leftward/rightward direction can be positively distributed to the second bolt fastening portions 12 without the structural change of the cowl member 31. Thus, the loads acting on the respective bolt fastening portions can be equalized.

The fastening portion F includes: the third bolt fastening portion f3 arranged at a rear side and a vehicle width direction outer side of the first bolt fastening portion f1; and the fourth bolt fastening portion f4 arranged at a vehicle width direction outer side of and adjacent to the third bolt fastening portion f3. Therefore, the cowl member 31 can be restrained to the top portions 22 of the suspension tower 2 in a wide range. Thus, the torsional moment generated at the left and right end portions of the cowl member 31 can be further reduced.

An intersection angle which is formed by the extended line L2 including the line connecting the first and second bolt fastening portions f1 and f2 and the extended line L3 including the line connecting the third and fourth bolt fastening portions f3 and f4 and is located at a front side and a vehicle width direction outer side is set to a substantially right angle. Therefore, the left and right end portions of the cowl member 31, each of which portions is located at a vehicle width direction outer side of the corresponding first bolt fastening portion f1, can be restrained to the respective top portions 22 of the suspension towers 2. Thus, the torsional moment acting on the first bolt fastening portions f1 can be further reduced.

The cowl member 31 includes the flat surface portions each located at a rear side of and close to the first bolt fastening portion f1. Therefore, generation of load concentrating portions at the fastening portions F of the cowl member 31 can be suppressed.

The first and second bolt fastening portions f1 and f2 are coupled to the top portion 22 of the suspension tower 2 through the first bracket 11. Therefore, the left and right end portions of the cowl member 31 can be coupled to the respective top portions 22 of the suspension towers 2 without changing the structures of the top portions 22 of the suspension towers 2.

Next, Modified Examples obtained by partially changing the above embodiment will be explained.

1) The above embodiment has explained the example in which the center axis of the bolt of the first bolt fastening portion overlaps the connecting line connecting the centers of the left and right top portions. However, the center axis of the bolt does not necessarily have to be arranged on the connecting line. A part of the bolt may partially overlap the connecting line. For example, even in a case where a head portion of the bolt overlaps the connecting line, the effects of the present invention can be obtained.

2) The above embodiment has explained the example in which the intersection angle between the extended line including the line connecting the first bolt fastening portion and the second bolt fastening portion and the extended line including the line connecting the third bolt fastening portion and the fourth bolt fastening portion is a substantially right angle. However, at least when the intersection angle at the front side and the vehicle width direction outer side is not more than 90°, a torsional moment reduction function can be achieved.

3) The above embodiment has explained one example of the strut type suspension. However, the type of the suspension is not especially limited, and a significant effect can be obtained for a suspension including a suspension tower to which loads acting in the forward/rearward direction and the leftward/rightward direction are input.

4) Other than the above, a person skilled in the art can prepare embodiments obtained by making various modifications to the above embodiment within the scope of the present invention, and the present invention includes such embodiments.

LIST OF REFERENCE CHARACTERS

1 dash panel
2 suspension tower
11 first bracket
31 cowl member
V vehicle
E engine room
F fastening portion
f1 to f4 first to fourth bolt fastening portions
L1 connecting line
L2, L3 extended line
b1 to b4 bolt

The invention claimed is:

1. A side vehicle body structure of a vehicle, the side vehicle body structure comprising:
a pair of left and right suspension towers each formed so as to expand into an engine room of the vehicle and supporting a buffer device of a front suspension; and
a cowl member extending toward a vehicle body front side from an upper end portion of a dash panel separating the engine room and a vehicle interior from each other, wherein:
left and right end portions of the cowl member are coupled to respective top portions of the suspension towers by a pair of left and right fastening portions fastened to the respective top portions of the suspension towers by bolts;
each of the fastening portions includes:
a first bolt fastening portion arranged at a vehicle width direction inner side of a corresponding one of centers of the top portions of the left and right suspension towers and at least partially overlapping a connecting line connecting the centers of the top portions of the left and right suspension towers;
a second bolt fastening portion arranged proximate to a front side of the first bolt fastening portion;
a third bolt fastening portion arranged at a rear side and a vehicle width direction outer side of the first bolt fastening portion; and
a fourth bolt fastening portion arranged proximate to the vehicle width direction outer side of the third bolt fastening portion;
the third and fourth bolt fastening portions are arranged so as not to project toward the vehicle width direction outer side beyond a part of a corresponding one of the top portions of the left and right suspension towers, the part being located around the center of the corresponding one of the top portions of the left and right suspension towers; and
an intersection angle which is formed by an extended line including a line connecting the first and second bolt fastening portions and an extended line including a line connecting the third and fourth bolt fastening portions and is located at the front side and the vehicle width direction outer side is set to a substantially right angle or an acute angle.

2. The side vehicle body structure according to claim 1, wherein the cowl member includes flat surface portions each located at a rear side of and close to the first bolt fastening portion.

3. A side vehicle body structure of a vehicle, the side vehicle body structure comprising:
a pair of left and right suspension towers each formed so as to expand into an engine room of the vehicle and supporting a buffer device of a front suspension; and
a cowl member extending toward a vehicle body front side from an upper end portion of a dash panel separating the engine room and a vehicle interior from each other, wherein:
left and right end portions of the cowl member are coupled to respective top portions of the suspension towers by a pair of left and right fastening portions fastened to the respective top portions of the suspension towers by bolts;
each of the fastening portions includes:
a first bolt fastening portion arranged at a vehicle width direction inner side of a corresponding one of centers of the top portions of the left and right suspension towers and at least partially overlapping a connecting line connecting the centers of the top portions of the left and right suspension towers; and
a second bolt fastening portion arranged at a front side of the first bolt fastening portion; and
the first and second bolt fastening portions are coupled to the top portions of the suspension towers through brackets.

4. The side vehicle body structure according to claim 2, wherein the first and second bolt fastening portions are coupled to the top portions of the suspension towers through brackets.

* * * * *